United States Patent
Kopp

(12)
(10) Patent No.: US 6,401,483 B1
(45) Date of Patent: Jun. 11, 2002

(54) PORTABLE AIR CONDITIONER

(76) Inventor: Erich Kopp, 4074 Lake George Rd., Dryden, MI (US) 48428

( * ) Notice: Subject to any disclaimer, the term of this patent is extended or adjusted under 35 U.S.C. 154(b) by 0 days.

(21) Appl. No.: 09/657,662

(22) Filed: Sep. 8, 2000

(51) Int. Cl.[7] ............................................... F25D 3/02
(52) U.S. Cl. ........................................ 62/420; 62/457.2
(58) Field of Search ...................... 62/406, 419, 457.1, 62/425, 420, 457.2, 426, 434, 457.9, 457.7, 404, 407, 424, 430, 460, 421, 423, 457.3

(56) References Cited

U.S. PATENT DOCUMENTS

| | | | |
|---|---|---|---|
| 1,230,914 A | 6/1917 | McMoore | |
| 1,860,357 A | 5/1932 | Grant | |
| 2,022,523 A | 11/1935 | Roessler | ........................ 257/9 |
| 2,564,998 A | * 8/1951 | Sayers | |
| 2,584,442 A | 2/1952 | Frie | ........................ 257/137 |
| 2,802,347 A | * 8/1957 | Marcus | |
| 3,395,550 A | 8/1968 | Dungan | ........................ 62/400 |
| 3,405,758 A | 10/1968 | Walker et al. | ................. 165/16 |
| 3,411,569 A | 11/1968 | Hildreth | ........................ 165/63 |
| 3,498,076 A | 3/1970 | Michael et al. | ................ 62/244 |
| 3,625,022 A | 12/1971 | Johnson | ........................ 62/159 |
| 5,046,329 A | * 9/1991 | Travis, III | .................... 62/406 |
| 5,159,819 A | * 11/1992 | Wong | ............................ 62/419 |
| 5,685,165 A | 11/1997 | Bigelow, Jr. | .................. 62/420 |
| 6,170,282 B1 | * 1/2001 | Eddins | .................. 62/457.2 X |
| 6,227,004 B1 | * 5/2001 | Gerstein | ........................ 62/421 |

* cited by examiner

Primary Examiner—Chen-Wen Jiang
(74) Attorney, Agent, or Firm—Young & Basile, P.C.

(57) ABSTRACT

An air conditioning device engageable with a common receptacle to transfer and condition air over a conditioning media for discharge by the device. The device includes a support member and a blower for forcing air along an air passageway over the conditioning media and discharging the conditioned air to the exterior of the device.

13 Claims, 2 Drawing Sheets

PORTABLE AIR CONDITIONER

FIELD OF THE INVENTION

The present invention relates to portable air conditioning devices primarily used for recreational purposes.

BACKGROUND OF THE INVENTION

With the proliferation of outdoor recreational activities has come a demand from enthusiasts for the conveniences and luxuries found at home or only in expensive recreational equipment. One area of need is for devices that condition or assist in the control of temperature in modest interior spaces such as RV's, campers, enclosed pick-up truck beds, tents, small watercraft and the like. A particular need is to simply and inexpensively cool or heat such areas in high or low temperature regions or during the summer or winter seasons.

Prior art portable air conditioning devices have been problematic due to complexity in design, number of components, high operating and manufacturing costs and portability. Prior art devices have employed generators, pumps and conduit to circulate hot or cool fluid through radiators then passed an air movement device such as a fan to distribute warm or cold air. Such devices have required relatively high amounts of energy to power the pumps and fans. Prior art devices are also problematic in that the components are dedicated to the air conditioning device and are not suitable nor useful for other purposes when not needed.

Consequently, it would be desirable to provide a portable air conditioning device improving on the problematic conditions in prior art devices and to provide an air conditioning device that is simple, inexpensive, easy to operate and maintain.

SUMMARY OF THE INVENTION

The inventive portable air conditioner includes a support member that engages a receptacle, for example, a common ice chest or thermal insulating device having an open cavity filled with a conditioning media, for example, ice or thermal heat packs. The support member includes at least one opening in air flow communication with the cavity in the receptacle and defines an air flow passageway between the opening and the receptacle passing over the conditioning media.

The air conditioner further includes means for forcing air through the opening in the support member along the air passageway in a predetermined direction. The means can include at least one fan and can be powered by the direct current of a motor vehicle battery through connection with an accessory outlet. In a preferred aspect of the invention, the fan is attached to the support member adjacent the opening to draw air from the receptacle, over the conditioning media, and out the opening in the support member. In another preferred aspect, a deflector panel is attached to the support member and extends into the receptacle cavity to further concentrate the passage of air over the conditioning media and out the opening in the support member.

These and other features and advantages of the invention will be apparent after reading the following specification which, along with the drawings, describes and discloses preferred and alternate embodiments of the invention in detail.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

Figure 1:
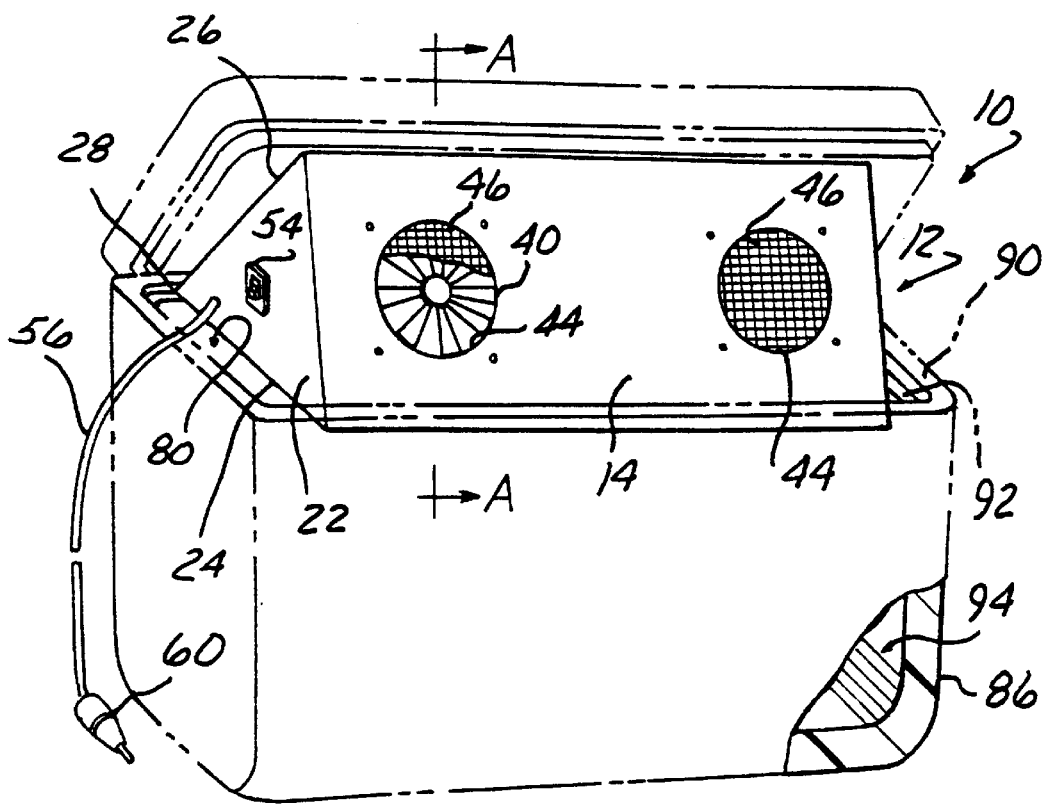
FIG. 1 is a perspective view of the portable air conditioner showing an application in a receptacle shown in phantom.

Referring to FIG. 1, a portable air conditioner is illustrated. The portable air conditioner 10 is shown engaged with a receptacle 86 having an open internal cavity 94 (shown in phantom).

The air conditioner 10 includes a support member 12. In a preferred aspect, support member 12 includes an elongate triangular shape having a front surface 14 and a rear surface 26. The front surface 14 includes an upper edge 16 and forward edge 18. The rear surface 26 preferably adjoins the front surface 14 at the upper edge 16. The rear surface 26 includes a rear edge 28 distant from the front edge 18 as shown in FIG. 1. In a preferred aspect, the front surface 14 and the rear surface 26 are joined by two opposing side surfaces 22 having lower edges 24. The lower edge 24, front edge 18 and rear edge 28 are shown as substantially planar, although it is understood the edges may be nonplanar without deviating from the invention. Preferably, the support member 12 is a one piece, substantially rigid member made from a polymeric material.

Although the apparatus is shown in a preferred triangular shape including the front, rear and side surfaces, it is understood that different shapes, for example, rectangular, rounded or domed may equally be used. Further, it is understood that fewer than four surfaces at different angular orientations may be used, for example, a single, relatively flat panel in a horizontal orientation to the receptacle 86 may be used without detracting from the disclosed invention.

Figure 3:
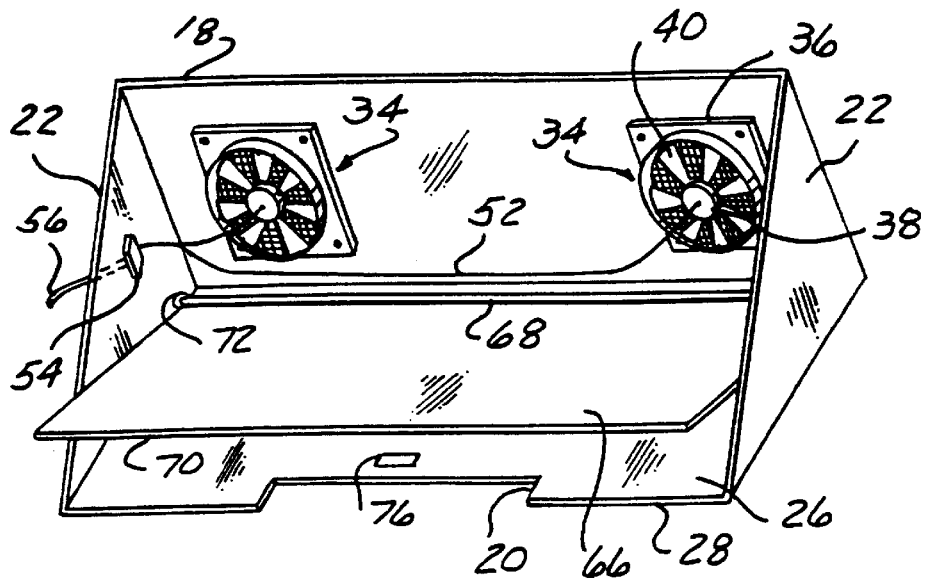
FIG. 3 is a perspective view of the underside of the air conditioner showing the deflector panel in a partially elevated position.
Figure 4:
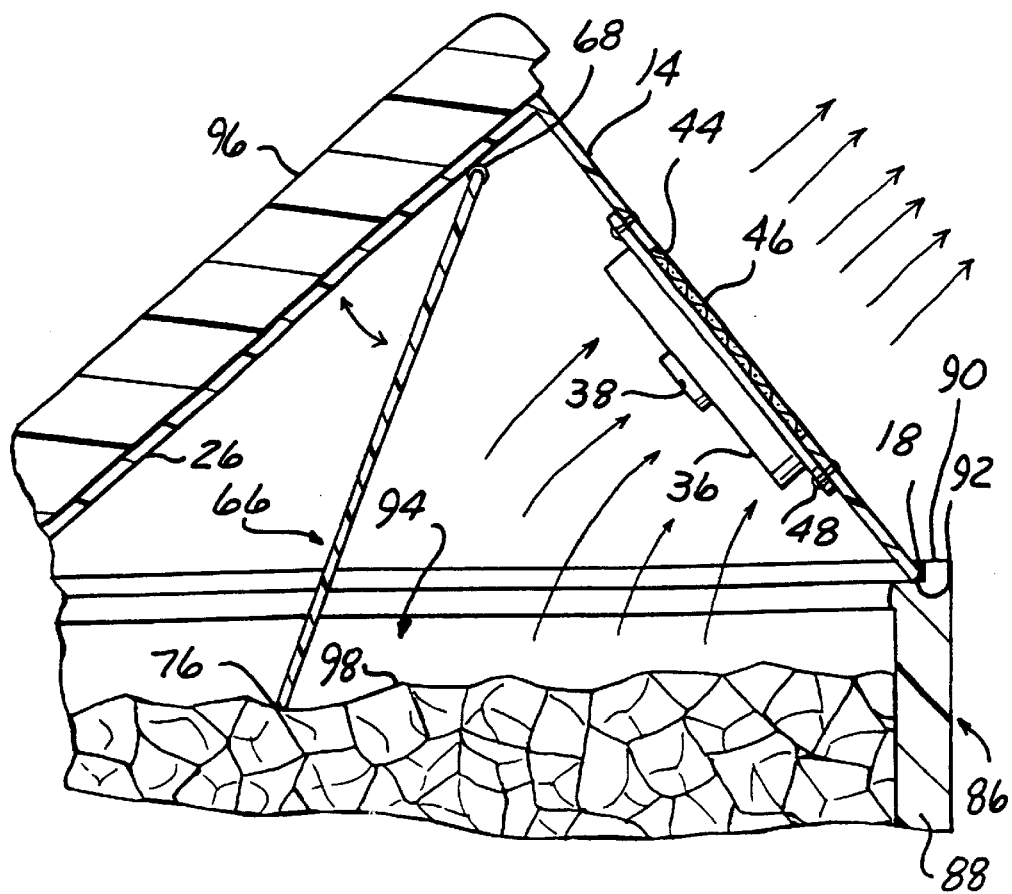
FIG. 4 is a sectional view of the air conditioner taken along A—A in FIG. 1.

In a preferred aspect, as shown in FIGS. 1, 3 and 4, the front surface 14 includes two openings 44 in air flow communication with the receptacle cavity 94 as best seen in FIG. 4. The openings 44 are preferably round in shape and positioned apart from one another as shown in FIG. 1. The air conditioner 10 further includes means for forcing air through the openings 44 in the front surface 14 in a predetermined direction. In a preferred aspect, two electrical fans 34 are used. Fans 34 are preferably attached to the inside of support member 12 on the front surface 14 adjacent openings 44 as best seen in FIGS. 3 and 4. Fans 34 may include a frame 36 housing an electric motor 38 having fan blades 40. In a preferred aspect, fan 34 includes a motor 38 suitable for use with a supply of direct current from a vehicular battery. Electric motors 38 are connected to electrical conductors 52 and may lead to an on/off switch 54 mounted to side panel 22 of support member 12 as best seen in FIGS. 1 and 3. The air conditioning unit 10 includes an electrically conductive power cord 56 having a plug 60, preferably in the form usable with a common automotive accessory socket or cigarette lighter receptacle. A grate 46 may be attached between the fan 34 and the front surface 14, as shown in FIG. 4, or may equally be attached to the opposite side of the front surface 14 to guard against inadvertent contact with the blades 40.

In an alternate aspect of the invention, fan motors 38 are suitable for use with a standard 110 volt alternating current power supply. In other alternate aspects, motors 38 may be powered by standard disposable or rechargeable batteries, solar cells and the like. Although, the air conditioning unit 10 is described as including two openings 40 and fans 34, it is understood that one or more fans may be used in the present invention.

In a preferred aspect, the air conditioner 10 is engageable with a receptacle 86 as shown in FIG. 1 and 4. The receptacle 86 typically includes a base 88, a contoured upper edge 92 and an open, internal cavity 94. The air conditioner 10 is well adapted for use in combination with an ice chest or thermally insulated device commonly used for outdoor recreational activities. As best seen in FIGS. 1 and 4, the air conditioner 10 is placed over the receptacle cavity 94 such that the forward edge 18 and rear edge 28 rest on an existing contoured upper edge 92. The upper edge 92 of the receptacle is common to such receptacles to provide an insulating seal with the receptacle cover 96.

When it is desired to change or maintain the condition of air in a given area, the receptacle 86 may be wholly or partially filled with a conditioning media 98, for example, ice or a chilled material as shown in FIG. 4. Equally, other sources of conditioning media could be used, for example, heat packs, dehumidification media such as silica, humidification media such as water or aromatic media such as an air freshener. In a preferred aspect, the air conditioner 10 is of a length and a width to substantially cover or obstruct the open receptacle cavity 94 as shown in FIG. 1 leaving a small opening 80 leading into and out of receptacle cavity 94 between side surfaces 22 and the upper edge 92 of the receptacle. In this position of the air conditioner 10, an air passageway is established through the openings 80, through the receptacle cavity 94, over the material 98, and through the openings 40 in the support member 12.

The fans 34 operate to force air in a predetermined direction along the air passageway to cool or warm the air, as desired, as the air passes over the conditioning media 98 in the receptacle cavity 94. In a preferred aspect, the fans 34 operate to draw air from the openings 80 through the receptacle cavity 94, over the conditioning media 98, and through the openings 40 to the exterior of support member 12.

Figure 2:
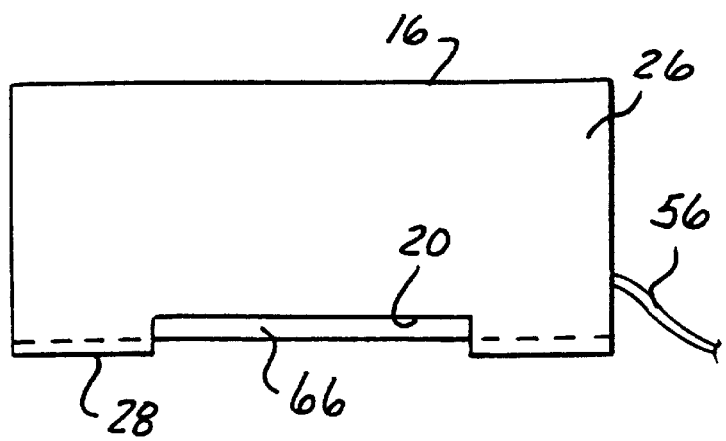
FIG. 2 is a rear view of the air conditioner.

In an alternate aspect, additional openings may be included to increase air intake to accommodate the output of fans 34, for example, the opening 20 in the rear surface 26 shown in FIGS. 2 and 3. In an alternate aspect, the fans 34 may draw air from the exterior of the front surface 14 and force the air over the conditioning media 98 to exit the air conditioner 10 through the openings 80 or other openings, for example, the opening 20 in the rear surface 26.

Referring to FIGS. 3 and 4, in a preferred aspect, the air conditioner 10 may include a deflector panel 66 attached to the side surfaces 22 of the support member 12. The deflector panel 66 is constructed of a one piece polymeric material having a rounded upper edge 68 extending slightly beyond the width of the panel 66. The deflector panel 66 also includes a lower edge 70. The deflector panel 66 is removably and rotatably attached to the side surfaces 22 through a frictional or snap in connection at the extended upper edge 68 into receivers attached to the side surfaces 22.

In a preferred aspect, after positioning the air conditioner 10 over a receptacle 86, the reflector 66 is allowed to freely rotate down into the receptacle cavity 94 to contact material 98. The deflector panel 66 functions to further eliminate dead air space in cavity 94 and concentrate the flow of air over the conditioning media 98 along the air passageway. When the media 98, for example ice, melts and reduces in height within the cavity 94, the deflector 66 freely rotates downward and continues to concentrate the air flow over the conditioning material 98. The deflector panel 66 also functions to collect water condensation and direct the back to the receptacle cavity 94. When not in use, the deflector panel 66 may be temporarily secured to the rear surface 26 through a suitable means, such as a hook and loop fastener 76.

In operation, the air conditioning unit 10 is preferably engaged with a receptacle 86 which is filled with a desired conditioning media 98 to lower, raise or maintain the temperature of an area. The air conditioner 10 is placed over the receptacle 86 in communication with cavity 94 and the deflector 66 is allowed to rotate down and contact the conditioning media 98 to concentrate the flow of air over the media 98. A plug 60 is connected to a suitable power source which may begin rotation on fans 34. Alternatively, a switch 54 may be engaged to begin rotation of the fans 34. The fans 34 forceably draw air from the openings 80 and over the media 98 to condition the air as desired along the air passageway for discharge through the openings 40 to the exterior of the support member 12. After the conditioning media 98 loses its desired conditioning properties, the cavity 94 can simply be refilled with new or regenerated conditioning media 98 and the air conditioning unit 10 can be replaced atop of the receptacle 86 to continue operation. When not in use, the receptacle 86 may function in its common capacity, for example, as an ice chest, and the air conditioning unit 10 may easily be stored or used as a air circulation device.

What is claimed is:

1. A portable air conditioner for use with a receptacle storing a conditioning media in a cavity, the air conditioner comprising:

a support member adapted to be removably engageable with the receptacle and having at least one opening in air flow communication with the receptacle cavity, the opening in the support member defining an air passageway over the receptacle and the conditioning media;

means, attached to the support member, for forcing air along the air passageway through the opening in the support member in a predetermined direction; and a deflector panel rotatably engageable with the support member and positioned along the air passageway to concentrate the flow of air over the conditioning media.

2. The air conditioner of claim 1 wherein the deflector panel is rotatably attached to the support member and extends into the receptacle cavity adjacent the conditioning media.

3. A portable air conditioner for use with a receptacle storing a conditioning media in a cavity, the air conditioner comprising:

a support member engageable with the receptacle to substantially obstruct the receptacle cavity, the support member having at least one opening in air flow communication with the cavity and a front surface defining the opening and an adjoining rear surface, a portion of the front and rear surfaces engaging the receptacle, the opening in the support member and the receptacle defining an air passageway over the conditioning media; and a fan attached to the support member adjacent the opening for forcing air along the air passageway through the opening in the support member in a predetermined direction.

4. The air conditioner of claim 3 wherein the support member further comprises at least one side surface joining the front and rear surfaces.

5. The air conditioner of claim 3 further comprising a deflector panel attached to the support member to concentrate the flow of air over the conditioning media along the air passageway.

6. The air conditioner of claim 3 wherein the fan further comprises a direct current electric motor.

7. The air conditioner of claim 3 wherein the predetermined direction of air flow is from the receptacle cavity through the opening in the support member.

8. A portable air conditioner comprising:

a receptacle having an open cavity and a conditioning media in the cavity;

a support member removably engageable with the receptacle having at least one opening in air flow communication with the receptacle cavity, the opening in the support member and the receptacle defining an air passageway over the conditioning media;

a deflector panel rotatably attached to the support member, the deflector panel extending into the receptacle cavity; and a fan attached to the support member adjacent the opening for forcing air along the air passageway in the support member in a predetermined direction.

9. The portable air conditioner of claim 8 wherein the support member further comprises a front surface defining the opening and an adjoining rear surface, a portion of the front and rear surfaces engaging the receptacle.

10. The air conditioner of claim 9 wherein the support member further comprises at least one side surface joining the front and rear surfaces.

11. The air conditioner of claim 8 wherein the deflector panel is removably attached to the support member.

12. A portable air conditioner for use with a recepatable storing a conditioning media in a cavity, the air conditioner comprising:

a support member engageable with the receptacle to substantially obstruct the receptable cavity, the support member having at least one opening in air flow communication with the cavity, the opening in the support member and the receptacle defining an air passage way over the conditioning media;

a fan attached to the support member adjacent the opening for forcing air along the air passageway through the opening in the support member in a predetermined direction; and a deflector panel rotatably attached to the support member and extending into the receptacle cavity to concentrate the flow of air over the conditioning media along the air passageway.

13. A portable air conditioner comprising:

a receptacle having an open cavity and a conditioning media in the cavity;

a support member engageable with the receptacle having a least one opening in air flow communication with the receptacle cavity and a front surface defining the opening and an adjoining rear surface, a portion of the front and rear surfaces engaging the receptacle, the opening in the support member and the receptacle defining an air passageway over the conditioning media, the support member further having at least one side surface joining the front and the rear surfaces; and a fan attached to the support member adjacent the opening for forcing air along the air passageway in the support member in a predetermined direction.

* * * * *